C. G. CASHMAN.
REAMER HEAD.
APPLICATION FILED JAN. 2, 1914.
1,168,160.
Patented Jan. 11, 1916.
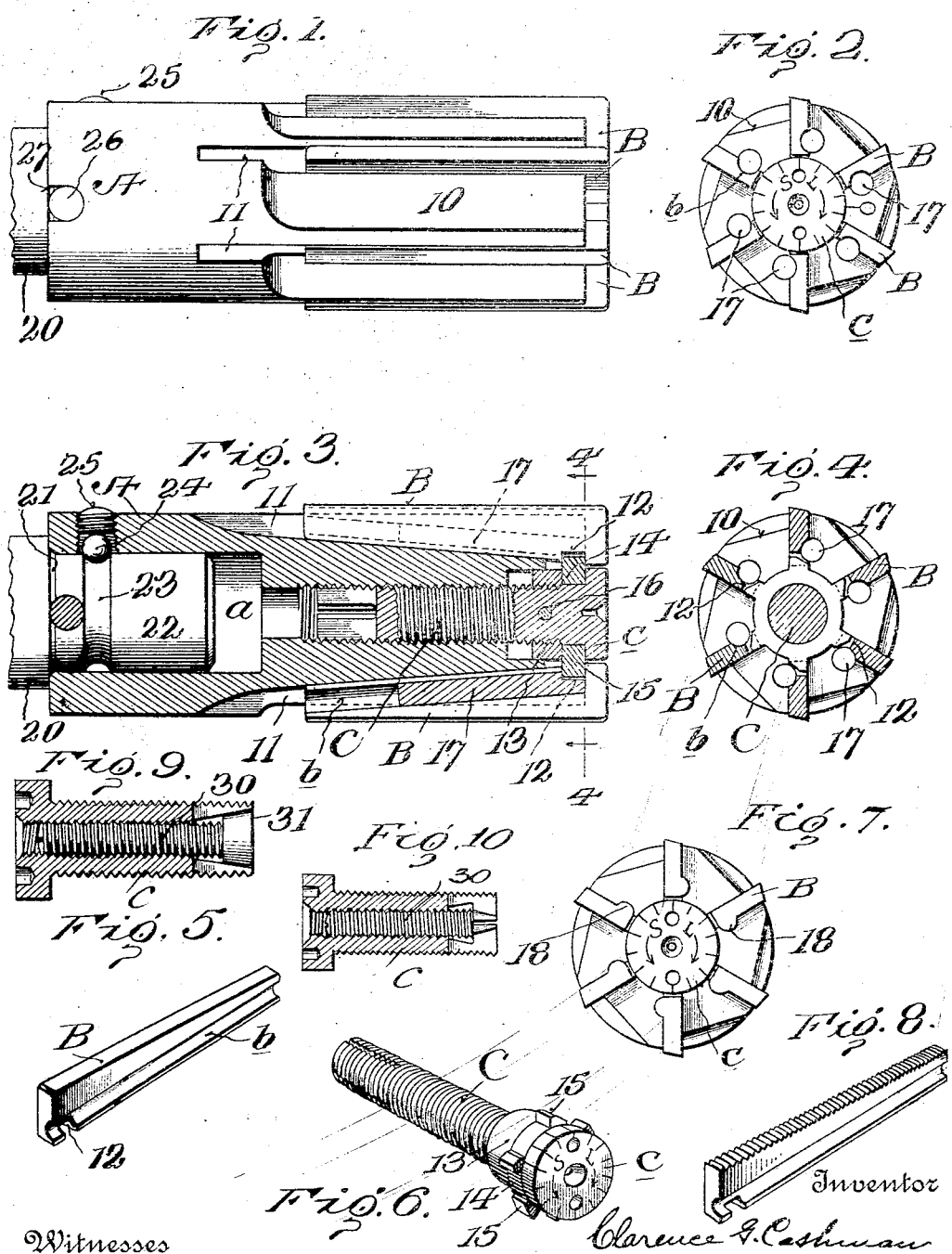
Inventor
Clarence G. Cashman
Witnesses
By Bradford & Doolittle
Attorneys

UNITED STATES PATENT OFFICE.

CLARENCE G. CASHMAN, OF WAYNESBORO, PENNSYLVANIA.

REAMER-HEAD.

1,168,160.

Specification of Letters Patent.

Patented Jan. 11, 1916.

Application filed January 2, 1914. Serial No. 809,914.

*To all whom it may concern:*

Be it known that I, CLARENCE G. CASHMAN, a citizen of the United States, residing at Waynesboro, Franklin county, and State of Pennsylvania, have invented and discovered certain new and useful Improvements in Reamer-Heads, of which the following is a specification.

My said invention consists in certain improvements in the construction and arrangement of parts of a reamer head of the type wherein the reaming blades may be moved radially to regulate the size or adapt the reamer for work of different diameters, all as will be hereinafter more fully described and claimed.

Referring to the accompanying drawing, which is made a part hereof, and on which similar reference characters indicate similar parts, Figure 1 is a side elevation of a reamer head constructed in accordance with my said invention. Fig. 2 an end elevation thereof, Fig. 3 a longitudinal vertical section through the same, Fig. 4 a cross section as seen from the dotted line 4—4 in Fig. 3, Fig. 5 a detail perspective of one of the reamer blades, Fig. 6 a detail perspective of the operating screw, Fig. 7 an end elevation of a modified form, Fig. 8 a perspective view of a modified form of reamer blade, Fig. 9 a detail section showing a modification in a detail, and Fig. 10 a detail section of a further modified form.

In said drawings the portions marked A represent the body of the reamer head, B the reamer blades, and C the operating screw.

The body A is a hollow steel head formed with a socket $a$ adapted to be secured to the arbor of the machine. In Figs. 1 and 3 I have illustrated a preferred means for this purpose wherein the machine arbor 20 is formed with a shoulder 21, the smaller portion 22 beyond said shoulder being adapted to enter and fit in said socket $a$. Said portion 22 is formed with a circumferential groove 23 which is engaged by a ball 24 held in place by a screw 25 in a radial perforation in body A. A pin 26 fast in the arbor 20 engages notches 27 in the end of body A to secure driving engagement. While I regard this as a desirable means for mounting the reamer on the arbor, it will be understood that it may be done in any approved or well known manner. The body A is formed at its front end with flat faces or sides 10 around its periphery, each face being tangential to its circumference. Said faces correspond in number to the number of reamer blades. In the construction shown there are six reamer blades and six transverse faces 10, each extending tangentially from a point on the circumference just behind one blade to the groove for the adjacent blade and at a point a distance inside of the circumference. A series of longitudinal slots 11 are formed in the body at the points between said tangential faces, in which the reamer blades are mounted. The bottom of each of said slots is formed tapered as shown most clearly in Fig. 3, the slot being deeper near the outer end than at the inner end thereof.

The reamer blades B are of a form best shown in Figs. 3 and 5 and are adapted to fit in the slots 11, their inner edges being tapered to correspond with the taper of the bottom of said slots. The backs of said blades rest against the backs of the respective slots which extend to the periphery of the body, the body being cut away in front to below the operating or cutting edge of the blade to provide for clearance in operation and allow for its adjustment to different radial positions. Each blade is formed with a notch 12 near its front end for engagement with the retaining member.

The operating screw C is mounted in a central screw-threaded perforation in the body A, its inner end being split and (in the principal construction) adapted to expand to form a tight fit and guard against accidental turning. Its front end is formed with a head $c$ between which and a collar 13 is mounted a wheel 14 having radial projections 15 adapted to engage with the notches 12 in the respective blades. The projections 15 correspond in number with the number of the blades. The outer end of body A is formed with an enlarged recess in which collar 13 on screw C may slide as the screw is adjusted. Wheel 14 corresponds in diameter to the diameter of the end of said body and the diameter of head $c$ is slightly less than the diameter of the wheel 14. In assembling these parts the wheel 14 is placed upon the screw C back of the head and then collar 13 is screwed, or otherwise adjusted, on the shank thereof until it impinges against said wheel 14 so that said wheel will be held from easy turning. It is secured in this position by a pin 16 which extends through a hole in the shank of the screw and said collar. While wheel 14 is thus held from turning easily it may nevertheless be turned by applying a little force so as to throw projections 15 out of notches 12 and release blades C so that they may be slid freely in grooves 11 independent of each other and removed or replaced. Each of the reamer blades B is formed with a longitudinal groove *b* in one side which engages with a longitudinal rib on one wall of its groove 11. Said ribs are preferably formed, as shown, by one side of pins 17, inserted in perforations in the body, each of which cuts, for less than half its circumference, into one of the several grooves 11. Said blades are thus retained from radial displacement and held rigidly in said grooves throughout their entire lengths while in operation.

In Fig. 7 I have shown a modification in which the blades are formed with segmental ribs 18 which engage with correspondingly shaped grooves in the back of the grooves 11 by which the same object is accomplished. It will be understood that these or any form of inter-engaging formation between the blades and the body whereby said blades are allowed to slide in their grooves may be employed. Whichever form of blade is used the inter-engaging formations between the blades and the body are parallel with the bottoms of the grooves in said body, so that said blades have a firm rest on the bottoms of said grooves throughout substantially their entire lengths and are also held from radial displacement by the inter-engaging formation which also extends substantially throughout their entire length.

In Fig. 9 I have shown a means for spreading the inner split end of screw C consisting of a screw 30, in a central screw-threaded perforation in screw C, on the end of which is rigidly secured a conical collar 31 adapted to fit in a correspondingly formed recess in said split end. By backing said screw 30 the inner end of screw C will be spread, as will be readily seen. In the form shown in Fig. 10 the end of screw 30 is pointed, and the recess in screw C also correspondingly formed. This being a mere reversal of form it will be seen that screw C will be spread at its inner end when screw 30 is forced inward.

These and other modifications in details of construction will readily suggest themselves as within the scope of my invention, as defined in the appended claims.

Indicator marks as S—L— are preferably formed on head *c* of screw C which with a mark *o* on an adjacent part of the face of the end of body A may be used to indicate adjustments.

Having thus fully described my said invention, what I claim as new and desire to secure by Letters Patent is:

1. A reamer comprising a body formed with longitudinal radial grooves arranged at predetermined distances around its periphery, reamer blades mounted in said grooves, a screw for sliding said reamer blades longitudinally mounted in a screw-threaded perforation in said body, and rotatable means carried by said screw for engaging said blades whereby they may be adjusted, substantially as set forth.

2. A reamer head comprising a body formed with longitudinal grooves spaced about its periphery and having tapered bottoms, reamer knives mounted in said grooves formed with correspondingly tapered inner edges resting on the bottoms of said grooves, a screw mounted in said body, a part mounted to turn thereon and move therewith which engages said reamer knives to move them longitudinally, whereby said reamer head may be expanded and contracted, substantially as set forth.

3. A reamer head comprising a body formed with a series of flat tangential surfaces at its operative end of equal width and with a longitudinal slot at the inner edge of each of said surfaces formed with a tapered bottom, reamer knives formed with correspondingly tapered inner edges mounted in said slots to rest on said bottoms, a screw mounted in said head, and a wheel mounted on said screw and formed with projections adapted to engage notches in said reamer knives, substantially as set forth.

4. A reamer head comprising a body formed with longitudinal grooves spaced apart around its periphery, pins mounted in longitudinal perforations alongside the back faces of said grooves and cutting into said grooves for less than half their circumference, reamer blades formed with longitudinal segmental grooves in their sides adapted to be mounted in said grooves in the head and engage to slide on the ribs consisting of the portions of said pins projecting into the grooves, a screw mounted in the body, and a connection between said screw and the blades whereby they may be adjusted longitudinally, substantially as set forth.

5. A reamer head comprising a body formed with a series of flat tangential surfaces around its periphery, a longitudinal groove at the inner edge of each of said surfaces, reamer blades mounted in said grooves and secured from radial displacement by interengaging ribs and grooves one in the head and the other in the blade, a screw mounted in said body, and a rotatable part on said screw formed with projections adapted to engage said blades, whereby said blades may be moved with said screw, substantially as set forth.

6. A reamer head comprising a body formed with longitudinal radial grooves arranged at predetermined distances around its periphery, reamer blades mounted to slide in said grooves, a screw mounted in a screw-threaded perforation in said body and formed to be expanded at its inner end, and at its outer end carrying means inter-engaging with the cutters for adjusting them longitudinally, substantially as set forth.

7. A reamer head comprising a body formed with longitudinal radial grooves spaced about its periphery and formed with tapered bottoms, reamer blades mounted in said grooves with tapered inner edges resting on said bottoms, said grooves and blades being formed with inter-engaging parts parallel with the bottoms of said grooves, a screw mounted in a central screw-threaded perforation in said body, and formed with an expansible inner end, and means on the outer end of said screw engaging with said blades for adjusting them longitudinally, substantially as set forth.

8. A reamer head comprising a body formed with longitudinal radial grooves spaced about its periphery, reamer blades mounted in said grooves, said grooves and blades being provided with inter-engaging formations extending on an angle to the axis of the head, a screw mounted in a screw-threaded perforation in said head, and a part mounted on the outer end of said screw with projections adapted to engage notches in said blades, substantially as set forth.

9. A reamer head comprising a body formed with longitudinal radial grooves spaced about its periphery and formed with tapered bottoms, reamer blades formed with tapered inner edges mounted in said grooves to slide on said bottoms, means for holding said blades from radial displacement, a screw mounted in a screw-threaded perforation in said head and formed with an expansible inner end, and means mounted on the outer end of said screw for engaging said blades for sliding them longitudinally, substantially as set forth.

In witness whereof I have hereunto set my hand and seal at Waynesboro, Pennsylvania, this 20th day of December, A. D. nineteen hundred and thirteen.

CLARENCE G. CASHMAN.

Witnesses:
W. OTTO COOMBS,
ALF. N. RUSSELL.